Nov. 23, 1937.   J. M. KING   2,099,811
FLUID THERMO VALVE
Filed Sept. 2, 1931   3 Sheets-Sheet 2
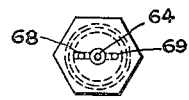
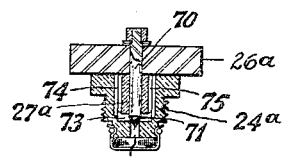
Fig.-7
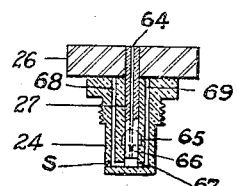
Fig.-6
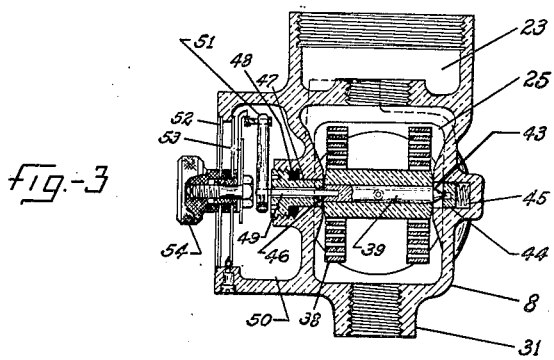
Fig.-3
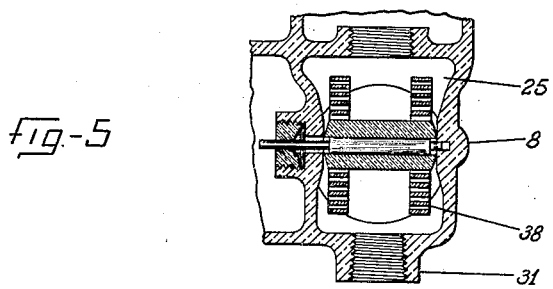
Fig.-5
INVENTOR.
Joseph Manon King Patented Nov. 23, 1937

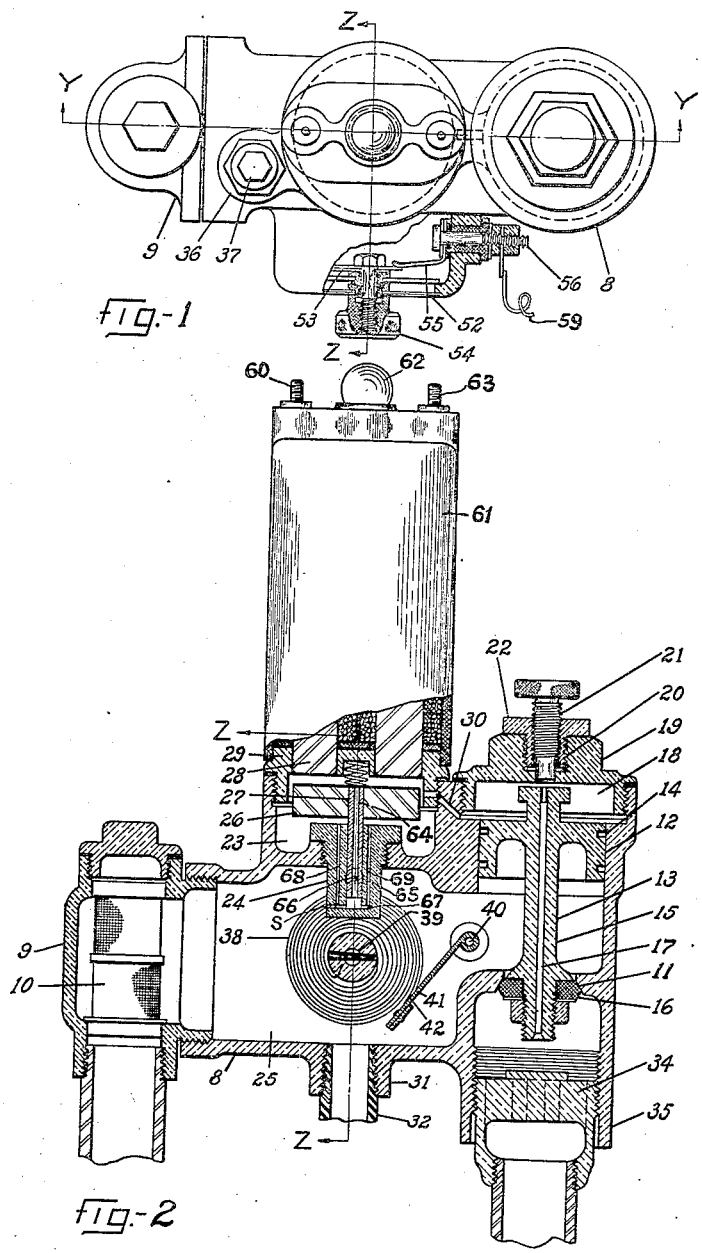

2,099,811

UNITED STATES PATENT OFFICE 2,099,811

FLUID-THERMO-VALVE

Joseph Marion King, Detroit, Mich.

Application September 2, 1931, Serial No. 560,856

2 Claims. (Cl. 236—84)

My invention relates to temperature regulating devices for roller mills, especially to that type employed in the manufacture of rubber and like resinous substances; to mechanisms used in coating and calendering fabrics, and to all devices wherein the control and regulation of temperature is desirable.

The objects of the device, when associated with rubber-manufacturing mills and appurtenances thereto, are as follows:

The automatic control and regulation of the temperature of the cooling medium, and its reduction in quantity; the availability of that ideal temperature during the process of manufacture, essential to a product of maximum quality; the acquirement and maintenance of predetermined fluid-temperature for, practically, all purposes, automatically effected.

The invention contemplates a fluid, temperature regulating device, adapted to automatically maintain an elective predetermined temperature; and to automatically function by means of internal pressure. To produce such an effect, the invention comprehends a thermostatic member, a primary valve electrically operated, a pressure chamber and an outlet valve.

The invention consists in the construction and combination of parts hereinafter set forth and more particularly described in the detailed specification and pointed out in the appended claims.

Reference is here made to my Patent Number 1,894,618 dated January 17, 1933, Rubber mill cooling device.

Throughout the various drawings, like numerals designate like parts.

Figure 1 is a plan view of a fluid thermo-valve embodying the invention.

Figure 2 is a view of a longitudinal section on the line y—y of Figure 1 disclosing an internal view of a thermostatic coil, piston valve, other members and their arrangement.

Figure 3 is a view of a lateral section on the line z—z of Figure 1, illustrating the manner of mounting the thermostatic coil, and its cooperating members to effect electrical contact.

Figure 5 is a partial view in section, showing a manner of mounting the thermostatic coil and the use of a packing member to prevent leak.

Figure 6 is a sectional view of a balanced valve, designated in the specification as an initial-valve.

Figure 7 is a sectional view of a common valve designated in the specification as an initial-valve. The balanced valve comprising a valvular rod to control the admission of fluid, the common valve having a conically shaped end to control such admission.

Figure 4:
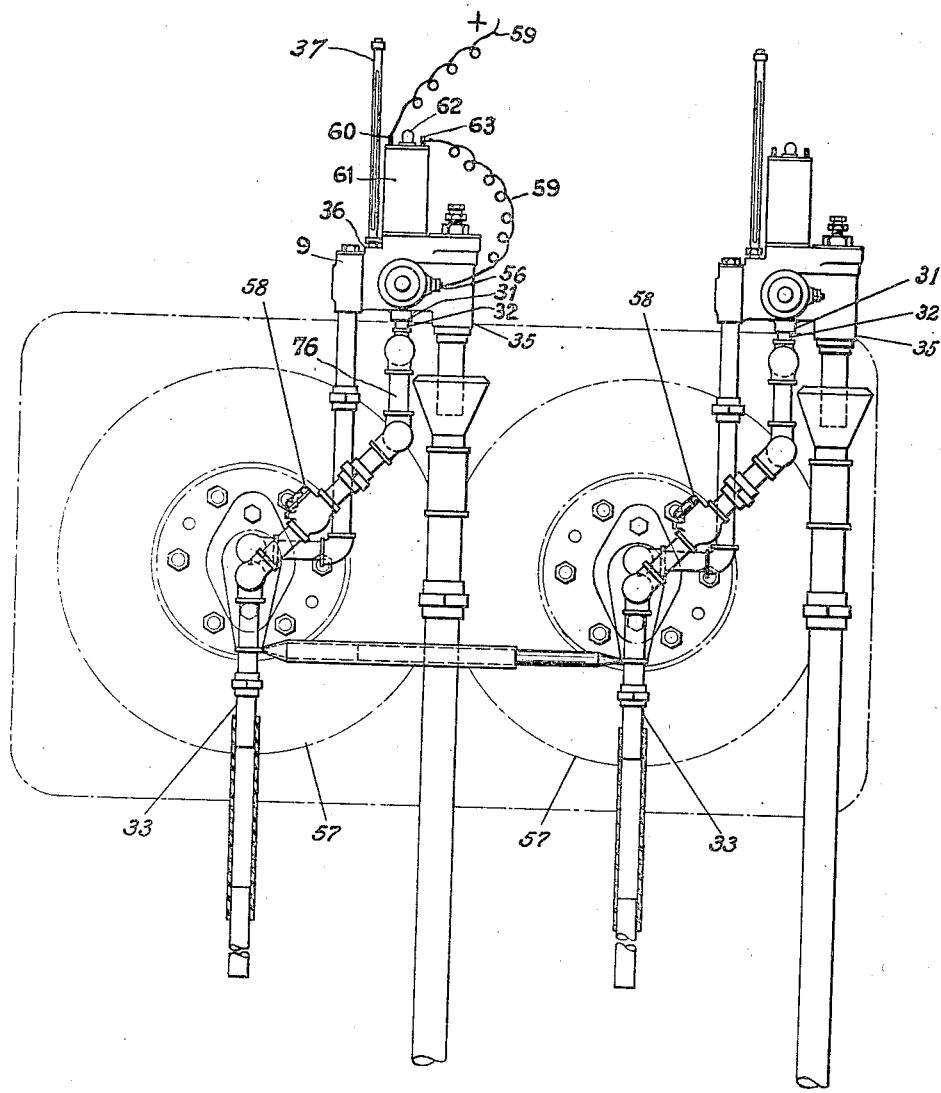
Figure 4 is a diagrammatical view of the fluid thermo-valve, installed on a rubber mill; showing means to circulate fluid, thermo-valve position and general pipe disposition.

The fluid thermo-valve is parallelogrammatic in form and comprises a housing 8, and an inlet-member 9 removably attached to the said housing and held in fluid-tight relation therewith by screw-threaded engagement. A suitable recess is machined in the said inlet-member for the reception of a strainer 10.

A valve-seated opening 11 is formed in, approximately, the bottom side of the end of the said housing, opposite to the said inlet-member, and an annular valve-fitting slide-way 12 is machined above, and concentric with, the said valve-seated opening for the reception of a piston valve 13; the said piston-valve comprising a packing-grooved, circular-piston 14, a stem 15, and an attachable-valve 16 designed to register with the said valve-seated opening. A central opening, longitudinally drilled throughout the length of the said piston-valve, constitutes an escape-vent 17 to atmospheric pressure. On the top side of the said housing and concentric with the said piston-valve, is formed a pressure-chamber 18, inclosed by a removable-lid 19, held thereto by screw-thread engagement, the top surface of the said circular-piston being adapted to form the bottom side of such chamber. A screw-threaded recess 20 is centrally formed in the said removable-lid and therein mounted a threaded adjusting-rod 21 held in fluid-tight relation therewith by a packing-nut 22, and adapted to open the said attachable-valve by contacting with the said circular-piston.

Adjacent to the said pressure-chamber, on the top surface of the said housing, is formed a magnet-chamber 23, in which is, centrally and removably, positioned an initial-valve 24. The parts of the common valve Figure 7 are designated 26a, 27a and 24a. The said initial valve 24 being held fluid-tight in the said magnet-chamber by screw-thread engagement, the said initial-valve being communicable with the interior 25 of the said housing. An armature 26 carrying a valve-rod 27 of the said initial-valve, is movably mounted in the said magnet-chamber, and adapted to be actuated by an electro-magnet 28, fixedly positioned in an inclosing-lid 29, which, removably and fluid-tightly incloses the said magnet-chamber by means of screw-threads. A communicating passage 30 is formed in the dividing wall of the said pressure-chamber and the said magnet-chamber.

A boss 31 is formed on the bottom side of the said housing and provided with a screw-threaded recess to the interior of the said housing for the reception of a fluid circulating-pipe 32 adapted to connect with a fluid source 33 and form a circulating passage. A fluid-flow regulating member 34 is positioned in the outlet-end 35 of the said housing, concentric with the said valve-seated opening, and by means of screw-thread engagement with the said outlet-end, is adapted to limit the downward motion of the said piston-valve. A boss 36 is formed on the top surface of the said housing and suitably machined for the fluid-tight reception of a thermometer 37.

A thermostatic coil 38 is laterally suspended in the said housing, fixedly mounted on a rotatable-shaft 39, the ends thereof being of cone-shape form and supported by suitably formed openings in the walls of the said housing. A rod 40 is positioned in the said housing, parallel with the axis of the said thermostatic coil and provided with a member 41, rotatably mounted thereon to releasably engage with immovable contact the outer end 42 of the coil of the said thermostatic coil, to prevent its tendency to rotate when subjected to the influence of heat. The end 43 of the rotatable-shaft 39 is provided with a spring-rest member 44 positioned in a support-opening 45. The opposite-end 46 of the rotatable-shaft 39 is mounted in a valve-seated member 47, positioned, fluid-tight, in a support-opening 48, and adapted by means of the spring-rest member 44 and internal fluid pressure, to register, in fluid-tight relation, with the valve-seated member 47. An extension 49 (see Fig. 3) of the rotatable-shaft 39 is adapted to pass through the valve-seated member 47 and into a dial-chamber 50 formed on an exterior side of the housing 8.

An electrical contact-arm 51 is mounted on the extension 49 and designed to rotate with the rotatable-shaft 39 when the thermostatic coil is actuated by a change in temperature. A calibrated disk-dial 52 is positioned in the dial-chamber 50 and adapted to rotate. An electrical dial-contact member 53 is carried on the inside surface of the disk-dial 52 and rigidly held thereto by screw-thread engagement with a manipulating knob 54 centrally positioned on the exterior of the disk-dial 52. An electrical chamber-contact member 55 (see Fig. 1) is firmly attached to the inside wall-surface of the dial-chamber 50 by means of screw thread engagement with a terminal-member 56, positioned in the wall of the dial-chamber 50 (see Fig. 3) and designed to join with an electrical lead-wire 59. The chamber-contact member 55 (see Fig. 1) is designed to press, with yielding resistance, on the dial-contact member 53, which is adapted to contact with the contact-arm 51 (see Fig. 3) when the said thermostatic coil is influenced by temperature-change.

The lead-wire 59, (see Figs. 4 and 1) which is designed to carry the plus current, is attached to a binding post 60 formed on the top side of an electro-magnet cover 61 which houses the electro-magnet 28; thence the lead-wire 59 is made connective with the electro-magnet 28 and an electric light 62 positioned in the top side of the cover 61. Leading from the electro-magnet 28 and the electric bulb 62, the lead-wire 59 communicates with a binding post 63 also fashioned on the top side of the cover 61 and thence connects with the terminal-member 56 (see Fig. 1).

It is to be observed that when the circuit is closed by the contacting members, viz. contact-arm 51 and dial-contact member 53, the contact-arm becomes the return or ground part of the circuit, communicating the "I. R. drop" current to the metal of the thermo-valve. The minus wire (not shown) of the generator or other electrical source may, therefore, be attached to any metal or piping which is in touch with the thermo-valve. Throughout the electrical installation it is to be noted that suitable insulation has been employed as evidenced by the character of crosshatching.

The initial-valve 24, Fig. 6, positioned in the magnet-chamber 23 is of the balanced type. An annular, concentric opening is longitudinally formed in its body for the reception of a valve-rod 27; a central, longitudinal opening 64 is formed throughout the length of the valve-rod 27. A semicircular-opening 65 is laterally formed through the lower portion of the valve-body to admit fluid from the interior 25 (see Fig. 2); an opening 66 is made laterally through the lower portion of the valve-rod 27 to communicate with its longitudinal opening 64 and the semicircular-opening 65 of the valve body. A lateral opening or chamber 67 is formed in the extreme portion of the valve body and made communicable with the central, longitudinal opening 64 of the valve-rod 27 and also connective with opening 68 and opening 69 formed longitudinally in the valve body, such openings having an outlet to the magnet-chamber 23 and providing facility for an equalized pressure on the lower and upper ends of the valve-rod 27. The armature 26, which under magnetic influence operates the initial-valve 24 is one of its members. Mounted on the upper end of the valve-rod 27, the armature 26 limits the downward position of the valve-rod 27 by contacting with the top of the initial-valve 24 and in such downward position closes the opening 66 of the valve-rod 27, thus preventing the entrance of fluid to the magnet-chamber 23 from the interior 25.

The initial-valve 24, Fig. 7, is of the common type. Similar in form to that of Fig. 6, a central, longitudinal opening is formed in the valve body for the reception of a valve-rod 70, having a conically shaped valve-end 71, adapted to seat in an opening 72 formed in and near the bottom side of the valve body. A chamber 73 is formed around and above the opening 72 and adapted to communicate with the magnet-chamber 23 by parallel openings 74 and 75. The armature 26 illustrated in Fig. 6 is adapted to engage the upper end of the valve-rod 70 and to lift it off its seat against a helical spring (not shown) when magnetically energized. When the thermo-valve is to be subjected to unusually high pressure the balanced valve shown in Fig. 6 should be used as the initial valve.

When associated with a rubber mill, the fluid movement and functioning of the thermo-valve are as follows: The cooling medium, water under pressure, enters the mill roll 57 (see Fig. 4) by conduit means from the fluid source 33, emerges therefrom and by similar means enters the thermo-valve via its inlet-member 9; thence the cooling medium enters a circulating pipe 76, and by pressure due to the rotary motion of the roll mill 57 and the process of convection, the cooling medium is returned to the mill roll 57; thus causing a circulation of the cooling medium through the mill roll 57 and the said thermo-valve, to approximate, in the thermo-valve, the temperature obtaining in the said mill roll. A check valve 58 is interposed in the circulating line to prevent a reverse fluid flow while the thermo-valve is discharging. Should it be desired to operate the mill at a predetermined temperature for the cooling medium, viz.: 100 degrees Fahrenheit, the manner of setting the valve comprehends a clockwise movement of the dial-disk 52 so that the dial-contact member 53 (see Figs. 1 and 3) will keep out of touch with the contact-arm 51. When the desired degree of temperature is indicated by the thermometer 37 mounted in the boss 36 of the said thermo-valve, the disk-dial 52 is rotated counter-clockwise until the electric bulb 62 is lighted in response to such direction of movement. The light signal indicates that the dial-contact member 53 is in contact with the contact-arm 51 (see Fig. 3). The electric circuit is now closed. The current emanating from its source passes along the lead-wire 59 to the binding post 60, thence through the electro-magnet 28 and the electric bulb 62, which are wired in "parallel", to the binding post 63; thence the current passes to the terminal-member 56, to chamber-contact 55, dial-contact member 53 and thence to contact-arm 51 (see Figs. 4, 1 and 3) whence it is grounded to the minus, return wire (not shown).

In response to the closed electric circuit described, the electro-magnet 28 becomes energized and attracts to its poles the valve member armature 26. The initial-valve 24 is thereby opened and fluid under pressure passes from the interior 25 via the opened initial-valve 24 to the magnet-chamber 23 (see Fig. 2) and thence via passage 30 to the pressure chamber 18. It will be noted that the pressure in the pressure-chamber 18, under this condition, would be approximately equal to that of the interior 25. The upward pressure tendency of the circular-piston 14 and attachable-valve 16 would thereby be neutralized, and the pressure in the interior 25 would press downwardly against the attachable-valve 16 and cause it to open. By this means a fluid-discharge of the thermo-valve is effected, which continues until a temperature-change in the cooling medium causes the thermostatic coil to contract and correspondingly move the contact-arm 51 out of touch with the dial-contact member 53 and thus open the electric circuit. When the circuit is opened, the electro-magnet 28 becomes demagnetized, the armature 26 falls and closes the initial-valve 24; pressure, in the pressure-chamber 18, becomes atmospheric and that of the interior 25 serves to force the circular-piston 14 upward, the remaining fluid in the pressure-chamber 18 escaping through the escape-vent 17. The upward movement, it will be seen, closes the opening 11 with the attachable-valve 16, and in this manner stops the fluid discharge.

The escape-vent 17 of the piston-valve 13 provides a constant means for the escape of fluid and thereby facilitates the closing upward movement of the piston-valve by releasing the remaining fluid in the pressure-chamber 18 when the initial-valve 24 closes. Therefore, when the initial-valve 24 is functioning, the resulting pressure in the pressure-chamber 18 does not equal that obtaining in the interior 25. The difference, however, is designed to be small, so that the piston-valve is approximately balanced. When this condition is present the pressure in the interior 25 is applicable to the attachable-valve 16.

While it is believed the description and the drawings herein made and disclosed represent the invention in a practical and acceptable form, it is not intended or desired that the protection sought shall limit the invention to such form and detail but shall comprehend its essentials.

What I claim as new is:

1. A fluid thermo-valve comprising a unit body having an inlet, an outlet, and an outlet valve, the said unit body having therein an occluded housing having therein an electric switch, the said unit body having therein a magnet adapted to cause operation of said outlet valve, the said switch and magnet being in series in an electric circuit, the said unit body having therein a thermostatic element mechanically connected to operate said switch.

2. A fluid thermo-valve comprising a unit body having an inlet, an outlet, and an outlet valve, the said unit body having therein an occluded housing having therein an electric switch, the said unit body having therein a magnet adapted to cause operation of said outlet valve, the said switch and magnet being in series in an electric circuit, the said unit body having therein a thermostatic element mechanically connected to operate said switch in response to temperature-change.

JOSEPH MARION KING.